US012665866B2

(12) United States Patent
Maddi et al.

(10) Patent No.: US 12,665,866 B2
(45) Date of Patent: Jun. 23, 2026

(54) ARTIFICIAL INTELLIGENCE-BASED CHATBOT SYSTEM WITH MACHINE LEARNING-BASED PROCESSING OF DATA STRUCTURES

(71) Applicant: Dell Products L.P., Round Rock, TX (US)

(72) Inventors: Divya Maddi, Round Rock, TX (US); Bijan Kumar Mohanty, Austin, TX (US); Hung T. Dinh, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 57 days.

(21) Appl. No.: 18/794,285

(22) Filed: Aug. 5, 2024

(65) Prior Publication Data

US 2026/0039610 A1     Feb. 5, 2026

(51) Int. Cl.
*H04L 51/02* (2022.01)
*G06N 3/0442* (2023.01)

(52) U.S. Cl.
CPC ........... *H04L 51/02* (2013.01); *G06N 3/0442* (2023.01)

(58) Field of Classification Search
CPC .............................. H04L 51/02; G06N 3/0442
See application file for complete search history.

(56) References Cited

U.S. PATENT DOCUMENTS

| 10,757,044 B2 | 8/2020 | Fawcett |
| 11,200,506 B2 | 12/2021 | Wu et al. |
| 11,657,797 B2 | 5/2023 | Vishnoi et al. |
| 2017/0286979 A1* | 10/2017 | Chavez .................. G06F 15/16 |
| 2022/0244925 A1* | 8/2022 | Moss .................... G10L 15/183 |
| 2025/0111846 A1* | 4/2025 | Anwar Batcha .... G10L 15/1815 |

OTHER PUBLICATIONS

Ranjan, C., Step-by-step understanding LSTM Autoencoder layers, Towards Data Science, https://towardsdatascience.com/step-by-step-understanding-lstm-autoencoder-layers-ffab055b6352, Jun. 4, 2019.

* cited by examiner

*Primary Examiner* — El Hadji M Sall
(74) *Attorney, Agent, or Firm* — Ryan, Mason & Lewis, LLP

(57) ABSTRACT
Methods, apparatus, and processor-readable storage media for artificial intelligence-based chatbot systems with machine learning-based processing of data structures are provided herein. An example computer-implemented method includes processing data pertaining to one or more interactions between at least one user device and at least one artificial intelligence-based chatbot into one or more data structures; predicting at least one future task of at least a portion of the one or more interactions by processing at least portions of the one or more data structures using one or more machine learning techniques; and identifying at least one task handler component related to at least one chatbot functionality associated with the at least one predicted future task.

20 Claims, 8 Drawing Sheets

Figure 3:
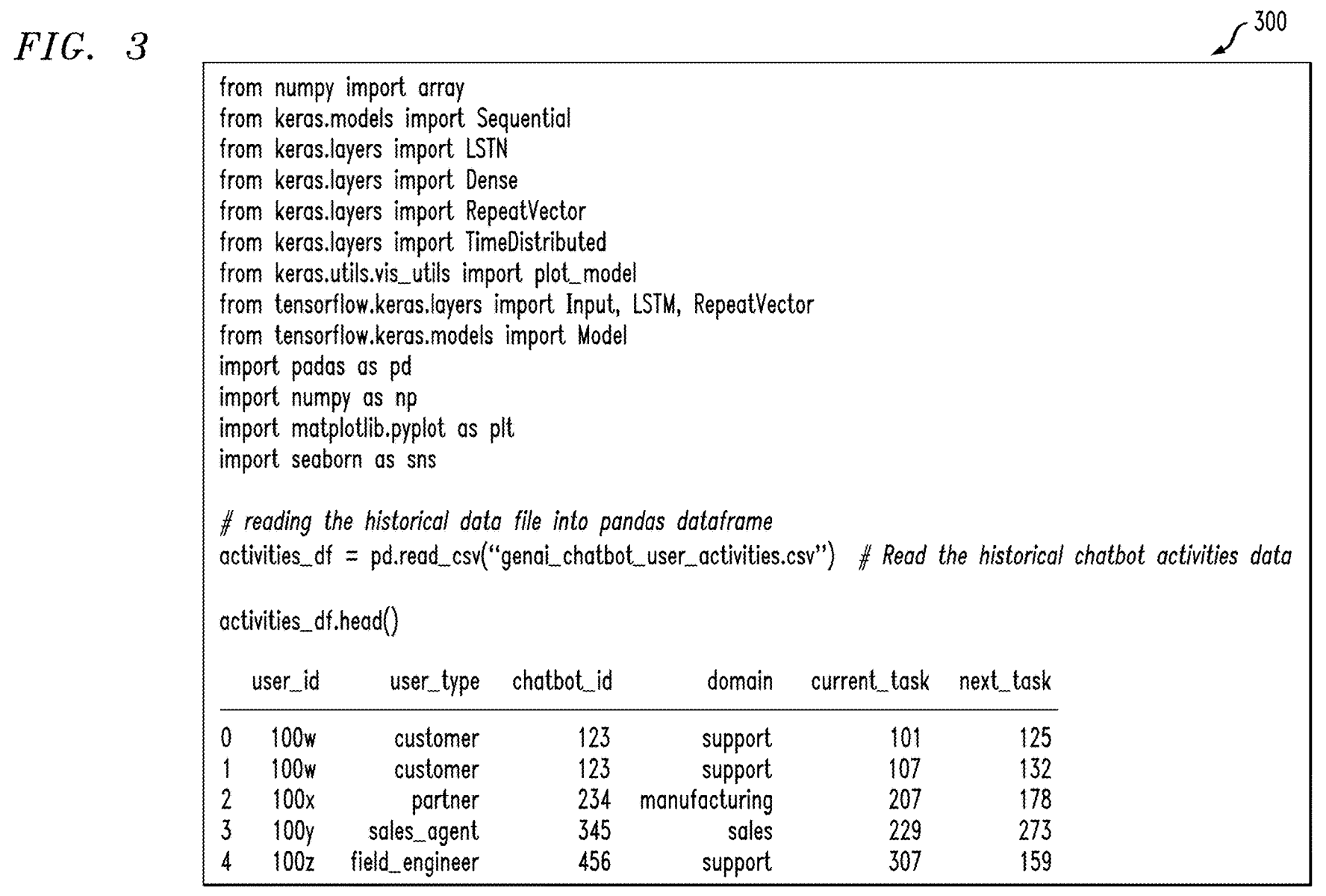

```
from numpy import array
from keras.models import Sequential
from keras.layers import LSTN
from keras.layers import Dense
from keras.layers import RepeatVector
from keras.layers import TimeDistributed
from keras.utils.vis_utils import plot_model
from tensorflow.keras.layers import Input, LSTM, RepeatVector
from tensorflow.keras.models import Model
import padas as pd
import numpy as np
import matplotlib.pyplot as plt
import seaborn as sns reading the historical data file into pandas dataframe
activities_df = pd.read_csv("genai_chatbot_user_activities.csv")   # Read the historical chatbot activities data activities_df.head()
```

|   | user_id | user_type | chatbot_id | domain | current_task | next_task |
|---|---------|-----------|------------|--------|--------------|-----------|
| 0 | 100w | customer | 123 | support | 101 | 125 |
| 1 | 100w | customer | 123 | support | 107 | 132 |
| 2 | 100x | partner | 234 | manufacturing | 207 | 178 |
| 3 | 100y | sales_agent | 345 | sales | 229 | 273 |
| 4 | 100z | field_engineer | 456 | support | 307 | 159 |

```
# Encode the categorical values by using Label Encoding
from sklearn.preprocessing import LabelEncoder activities_df['user_type'] = LabelEncoder().fit_transform(activities_df['user_type'])
activities_df['domain'] = LabelEncoder().fit_transform(activities_df['domain'])

activities_df.head()
```

| | user_id | user_type | chatbot_id | domain | current_task | next_task |
|---|---|---|---|---|---|---|
| 0 | 100w | 0 | 123 | 2 | 101 | 125 |
| 1 | 100w | 0 | 123 | 2 | 107 | 132 |
| 2 | 100x | 3 | 234 | 0 | 207 | 178 |
| 3 | 100y | 4 | 345 | 1 | 229 | 273 |
| 4 | 100z | 1 | 456 | 2 | 307 | 159 |

```
input_data = activities_df.to_numpy()

timesteps = 1
input_dim = 9 latent_dim = input_dim // 2
```

```
# define the LSTM encoder
encoder_inputs = Input(shape=input_shape)
encoder = LSTM(latent_dim, activation='relu', return_state=True)
_, state_h, state_c = encoder(encoder_inputs)
encoder_states = [state_h, state_c]

# define the LSTM decoder
decoder_inputs = Input(shape=(None, input_dim))
decoder_lstm = LSTM(latent_dim, activation='relu', return_sequences=True,
return_state=True)
decoder_outputs, _, _ = decoder_lstm(decoder_inputs, initial_state=encoder_states)

# define the output layer
output_layer = TimeDistributed(Dense(input_dim, activation='softmax'))
decoder_outputs = output_layer(decoder_outputs)

# define the model
model = Model([encoder_inputs, decoder_inputs], decoder_outputs)

# compile the model
model.compile(optimizer='adam', loss='categorical_crossentropy')

batch_size = 50
epochs = 200
# train the model on the historical actions data
model.fit([input_data, input_data], input_data,
          batch_size=batch_size,
          epochs=epochs,
          validation_split=0.2)
```

```
# use the trained encoder to predict the next action based on the current action
encoder_model = Model(encoder_inputs, encoder_states)

decoder_state_input_h = Input(shape=(latent_dim,))
decoder_state_input_c = Input(shape=(latent_dim,))
decoder_states_inputs = [decoder_state_input_h, decoder_state_input_c]
decoder_outputs, state_h, state_c = decoder_lstm(decoder_inputs, initial_state=decoder_states_inputs)
decoder_states = [state_h, state_c]
decoder_outputs = output_layer(decoder_outputs)
decoder_model = Model([decoder_inputs] + decoder_states_inputs, [decoder_outputs] + decoder_states)
```

```
def predict_next_action(current_action):
    # encoder the current action
    current_action = np.reshape(current_action, (1, timesteps, input_dim))
    states_value = encoder_model.predict(current_action)

# generate the next action
    target_seq = np.zeros((1, 1, input_dim))
    next_action = None
    while next_action is None:
        output_tokens, h, c = decoder_model.predict([target_seq] + states_value)
        next_action = output_tokens[0][-1]
        states_value = [h, c]
        target_seq[0][0] = next_action
    return next_action
```

*FIG.  9*

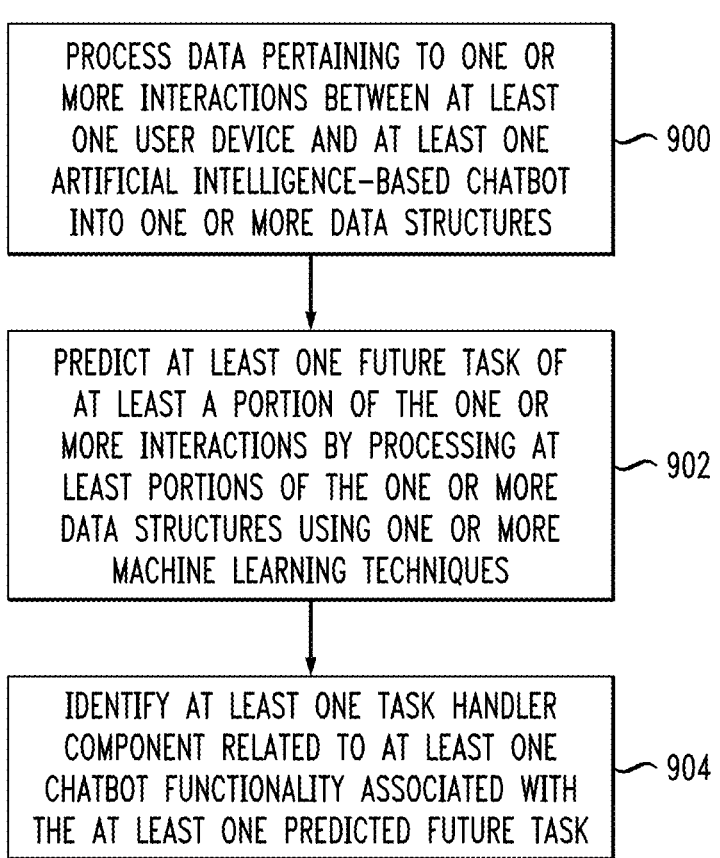

PROCESS DATA PERTAINING TO ONE OR MORE INTERACTIONS BETWEEN AT LEAST ONE USER DEVICE AND AT LEAST ONE ARTIFICIAL INTELLIGENCE-BASED CHATBOT INTO ONE OR MORE DATA STRUCTURES ⟋ 900

PREDICT AT LEAST ONE FUTURE TASK OF AT LEAST A PORTION OF THE ONE OR MORE INTERACTIONS BY PROCESSING AT LEAST PORTIONS OF THE ONE OR MORE DATA STRUCTURES USING ONE OR MORE MACHINE LEARNING TECHNIQUES ⟋ 902

IDENTIFY AT LEAST ONE TASK HANDLER COMPONENT RELATED TO AT LEAST ONE CHATBOT FUNCTIONALITY ASSOCIATED WITH THE AT LEAST ONE PREDICTED FUTURE TASK ⟋ 904

ARTIFICIAL INTELLIGENCE-BASED CHATBOT SYSTEM WITH MACHINE LEARNING-BASED PROCESSING OF DATA STRUCTURES

COPYRIGHT NOTICE

BACKGROUND

Chatbots are commonly used across a variety of contexts and use cases. However, conventional chatbot systems operate in isolation, and lack an understanding of other user interactions. Consequently, such conventional chatbot systems often produce repetitive queries, errors, wasted resources, and/or decreased user trust.

SUMMARY

Illustrative embodiments of the disclosure provide artificial intelligence-based chatbot systems with machine learning-based processing of data structures.

An exemplary computer-implemented method includes processing data pertaining to one or more interactions between at least one user device and at least one artificial intelligence-based chatbot into one or more data structures, and predicting at least one future task of at least a portion of the one or more interactions by processing at least portions of the one or more data structures using one or more machine learning techniques. Additionally, the method also includes identifying at least one task handler component related to at least one chatbot functionality associated with the at least one predicted future task.

Illustrative embodiments can provide significant advantages relative to conventional chatbot systems. For example, problems associated with repetitive queries, errors, wasted resources, and/or decreased user trust are overcome in one or more embodiments through predicting next actions in user-chatbot interactions using machine learning techniques and configuring chatbot task handler components corresponding to the predicted next actions.

These and other illustrative embodiments described herein include, without limitation, methods, apparatus, systems, and computer program products comprising processor-readable storage media.

BRIEF DESCRIPTION OF THE DRAWINGS

FIG. 3 shows example pseudocode for preprocessing historical data in an illustrative embodiment.

FIG. 4 shows example pseudocode for encoding categorical values in an illustrative embodiment.

FIG. 5 shows example pseudocode for configuring input data as an array in an illustrative embodiment.

FIG. 6 shows example pseudocode for creating a neural network model in an illustrative embodiment.

FIG. 7 shows example pseudocode for configuring an encoder model and a decoder model in an illustrative embodiment.

FIG. 8 shows example pseudocode for using a trained neural network model to predict a next action based on a current action in an illustrative embodiment.

FIG. 9 is a flow diagram of a process for predicting next actions in user-chatbot interactions using machine learning techniques and configuring chatbot task handler components corresponding to the predicted next actions in an illustrative embodiment.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
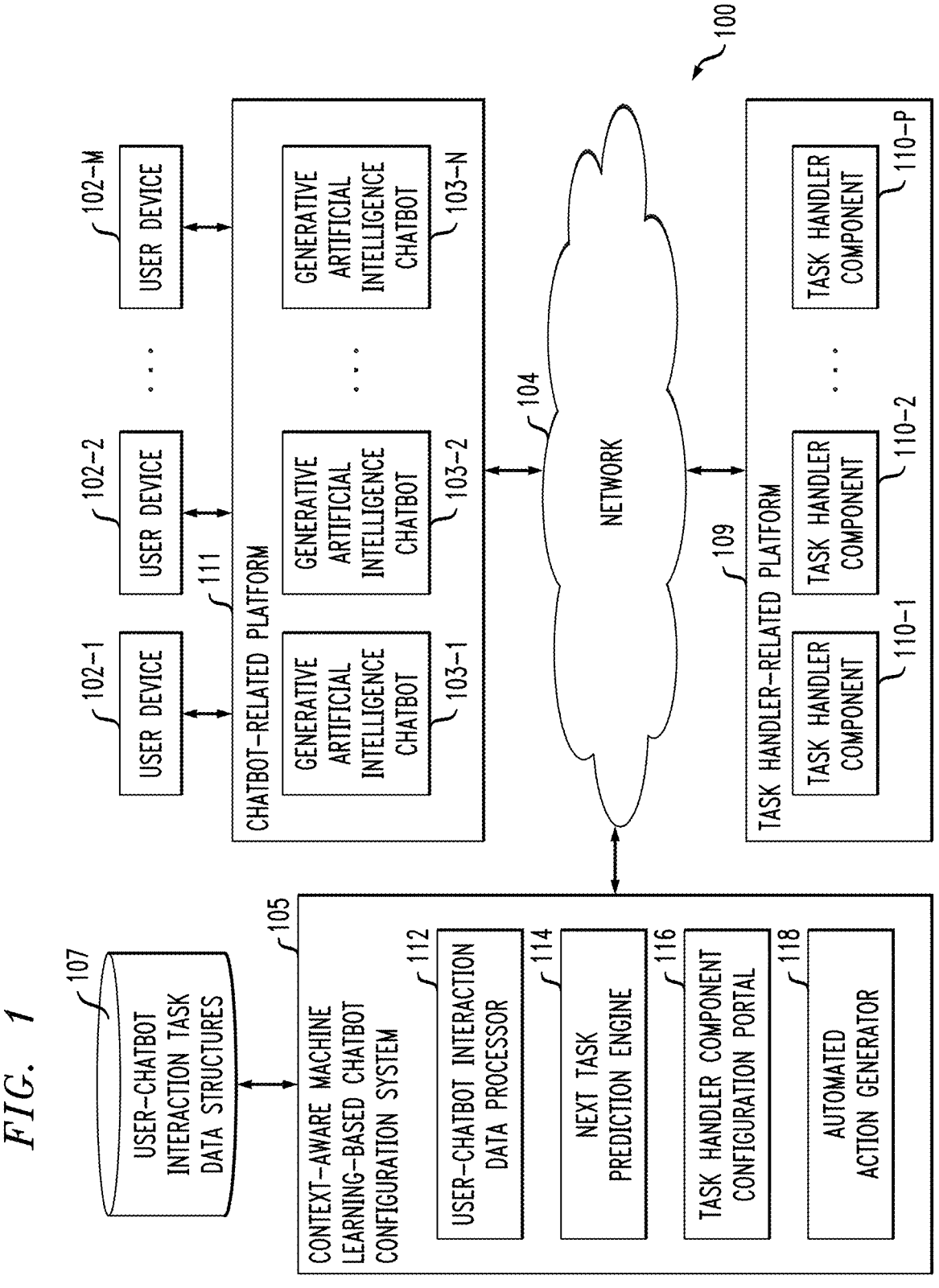
FIG. 1 shows an information processing system configured for predicting next actions in user-chatbot interactions using machine learning techniques and configuring chatbot task handler components corresponding to the predicted next actions in an illustrative embodiment.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102, and a plurality of generative artificial intelligence chatbots 103-1, 103-2, . . . 103-N, collectively referred to herein as generative artificial intelligence chatbots 103, executing on chatbot-related platform 111. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment.

Also coupled to network 104 is context-aware machine learning-based chatbot configuration system 105 and a plurality of task handler components 110-1, 110-2, . . . 110-P, collectively referred to herein as task handler components 110, executing on task handler-related platform 109. As used herein, task handler components broadly refer to software elements which include one or more frontends and one or more particular functionality-based microservices. Also, in one or more embodiments such as depicted in FIG. 1, generative artificial intelligence chatbots 103 are decoupled from task handler components 110. In such an embodiment, the task handler components 110 are decoupled from the generative artificial intelligence chatbots 103 such that one or more of the task handler components 110 can be used by and/or in connection with a plurality of the generative artificial intelligence chatbots 103. By way of example, depending on the predicted next task (predicted, e.g., by next task prediction engine 114 of context-aware machine learning-based chatbot configuration system 105) associated with a given one of the generative artificial intelligence chatbots 103, the respective task handler component, from among the task handler components 110, associated with a functionality which corresponds to the predicted next task, can be activated (e.g., by task handler component configuration portal 116 of context-aware machine learning-based chatbot configuration system 105) and used in and/or by the given chatbot.

Further, as detailed herein, in one or more embodiments, each of the task handler components 110 can be specifically created and/or configured for performing a particular functionality and/or purpose (for example, functionalities and/or purposes associated with a given enterprise related to the generative artificial intelligence chatbots 103 such as, e.g., warranty extensions, document summaries, file uploads, image generation, etc.).

Additionally, the user devices 102, as depicted in FIG. 1, may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, the context-aware machine learning-based chatbot configuration system 105 can have one or more user-chatbot interaction task data structures 107 configured to store data pertaining to user queries and/or user requests in a chatbot interaction, user tasks associated with a chatbot interaction, chatbot responses to user queries and/or requests, chatbot tasks associated with an interaction, etc. The term "data structure," as used herein, is intended to be broadly construed, so as to encompass, for example, a wide variety of different types of tables, arrays, graphs, trees, linked lists, and additional or alternative data relation mechanisms, as well as portions or combinations thereof. Accordingly, a given data structure can comprise a combination of multiple smaller data structures, possibly of different types, or a portion of a larger data structure. Numerous other arrangements are possible.

The user-chatbot interaction task data structures 107 in the present embodiment are implemented using one or more storage systems associated with the context-aware machine learning-based chatbot configuration system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the context-aware machine learning-based chatbot configuration system 105 are one or more input-output devices, which illustratively comprise keyboards, displays or other types of input-output devices in any combination. Such input-output devices can be used, for example, to support one or more user interfaces to the context-aware machine learning-based chatbot configuration system 105, as well as to support communication between the context-aware machine learning-based chatbot configuration system 105 and other related systems and devices not explicitly shown.

Additionally, the context-aware machine learning-based chatbot configuration system 105 in the FIG. 1 embodiment is assumed to be implemented using at least one processing device. Each such processing device generally comprises at least one processor and an associated memory, and implements one or more functional modules for controlling certain features of the context-aware machine learning-based chatbot configuration system 105.

More particularly, the context-aware machine learning-based chatbot configuration system 105 in this embodiment can comprise a processor coupled to a memory and a network interface.

The processor illustratively comprises a microprocessor, a central processing unit (CPU), a graphics processing unit (GPU), a tensor processing unit (TPU), a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows the context-aware machine learning-based chatbot configuration system 105 to communicate over the network 104 with the user devices 102, and illustratively comprises one or more conventional transceivers.

The context-aware machine learning-based chatbot configuration system 105 further comprises user-chatbot interaction data processor 112, next task prediction engine 114, task handler component configuration portal 116, and automated action generator 118.

It is to be appreciated that this particular arrangement of elements 112, 114, 116 and 118 illustrated in the context-aware machine learning-based chatbot configuration system 105 of the FIG. 1 embodiment is presented by way of example only, and alternative arrangements can be used in other embodiments. For example, the functionality associated with elements 112, 114, 116 and 118 in other embodiments can be combined into a single module, or separated across a larger number of modules. As another example, multiple distinct processors can be used to implement different ones of elements 112, 114, 116 and 118 or portions thereof.

At least portions of elements 112, 114, 116 and 118 may be implemented at least in part in the form of software that is stored in memory and executed by a processor.

It is to be understood that the particular set of elements shown in FIG. 1 for predicting next actions in user-chatbot interactions using machine learning techniques and configuring chatbot task handler components corresponding to the predicted next actions involving user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, two or more of context-aware machine learning-based chatbot configuration system 105, user-chatbot interaction task data structures 107, generative artificial intelligence chatbots 103, and task handler components 110 can be on and/or part of the same processing platform. Additionally or alternatively, in one or more embodiments, at least one of the generative artificial intelligence chatbots 103 can include one or more built-in task handler components 110. Also, in at least one embodiment, an agent (e.g., a large language model (LLM) agent) can be associated with at least one of the generative artificial intelligence chatbots 103, wherein the agent can incorporate one or more task handler components 110.

An exemplary process utilizing elements 112, 114, 116 and 118 of an example context-aware machine learning-based chatbot configuration system 105 in computer network 100 will be described in more detail with reference to the flow diagram of FIG. 9.

Accordingly, at least one embodiment includes designing dynamic user experiences for contextually aware, generative artificial intelligence-driven conversational interactions. Such an embodiment can include implementing generative artificial intelligence-based chatbots and/or LLM-based chatbots to provide capabilities beyond predefined scripts and/or rule-based responses of conventional chatbot systems to nuanced, context-aware conversations. In one or more embodiments, such context-aware chatbots can generate human-like responses, allowing for more fluid, engaging interactions that closely mimic talking to a human. Additionally, as further detailed herein, such an embodiment includes implementing generative artificial intelligence-based chatbots and/or LLM-based chatbots which can learn from other interactions to improve over time and offer a personalized experience that enhances user engagement and user trust in the chatbot systems.

Also, at least one embodiment includes implementing such chatbots across various domains, contexts, and/or enterprises while maintaining consistency in user interface (UI) and user experience. When different groups independently develop chatbots, it can lead to a fragmented user experience, wherein the stylistic elements, interaction patterns, and conversational tones vary significantly from one chatbot to another. Such inconsistency can confuse users, dilute user trust, and diminish the overall effectiveness of digital assistance. Further, the absence of a unified approach can result in redundancy, wherein multiple chatbots overlap in functionality but differ in quality and efficiency, leading to inefficient resource utilization and increased maintenance costs. Accordingly, one or more embodiments include implementing at least one task handler component-based chatbot to provide varied capabilities to a plurality of chatbots while maintaining a standard interface.

Referring again to FIG. 1, at least one embodiment includes configuring a pluggable user interface framework for chatbots, wherein each capability and/or experience is developed as a task handler component and plugged-in dynamically as predicted. Such a framework allows for the modular development of chatbot functionalities, wherein each feature (e.g., uploading a file for summarization, sending notifications to users, gathering context data, etc.) is encapsulated within its own task handler component. This modular approach ensures that specific functionalities can be developed, updated, and/or deployed independently, without impacting the overall chatbot system.

In addition, one or more chatbot functionalities can be dynamically predicted based at least in part on previous user interaction data and/or previous user behavior, and based on the prediction(s), one or more necessary user data components (e.g., one or more task handler components corresponding to the one or more predicted functionalities) can be dynamically plugged into the chatbot system. For example, a task handler component dedicated to file uploading can provide a streamlined UI component for users to upload one or more files and/or documents, which the chatbot system could then process and/or summarize, leveraging generative artificial intelligence and/or LLM capabilities. By way of further example, a context data task handler component can collect and provide relevant user information and/or session information to the chatbot system, enhancing the chatbot system's ability to deliver personalized responses.

The dynamic pluggability of task handler components allows for a highly flexible chatbot system, wherein new and/or additional capabilities can be introduced, and/or wherein existing capabilities can be modified with minimal friction, ensuring that the chatbot interface remains consistent. This not only improves the user experience by providing a seamless integration of diverse functionalities but also facilitates a more maintainable and scalable chatbot system, as users and/or teams can, for example, work on different aspects of the chatbot experience in parallel, reducing development time and accelerating enhancements.

As further detailed herein, one or more embodiments include dynamically predicting and/or determining which capabilities or functionalities are to be plugged-in to a given chatbot system based at least in part on predicting at least one task associated with the corresponding user chatbot session by leveraging historical usage data and one or more time-series based machine learning models.

Accordingly, such an embodiment includes configuring and/or implementing a framework wherein each individual chatbot system functionality or capability is developed as a task handler component which can then be dynamically plugged-in to the chatbot system based at least in part on the predicted next task. Such a framework can implement a unified conversational platform, which can serve as a central hub for all chatbot interactions, providing a consistent UI and interaction model regardless of the underlying chatbot-related technology. By standardizing the user experience across different chatbot functionalities, such a platform can facilitate smoother transitions and more intuitive interactions for users. Such standardization can involve, for example, developing, implementing and/or providing access to a set of common UI components, interaction patterns, and design standards for multiple chatbot systems. Additionally, such a platform, in one or more embodiments, can employ one or more adaptive UI elements (e.g., task handler components) which can be adjusted based on the context of the conversation and the specific capabilities of the underlying chatbot system, ensuring a seamless and coherent experience for users across different service touchpoints.

As detailed herein, to solve the problems of repetitive queries and lack of continuity in user interactions, one or more embodiments include implementing an advanced user behavior management and sharing system across multiple chatbots. Such a system can act as a centralized repository of user interaction time series data and context-related data, accessible by all chatbots within a designated set or group. The data in such a repository can be used to train at least one machine learning model, which can then be used to predict and/or generate recommendations. By way of example, when a user interaction moves in a conversation or across a conversation with the same chatbot, or is transferred from one chatbot to another chatbot, the advanced user behavior management and sharing system can provide the given chatbot with the relevant context and history of the user's previous interactions, ensuring a smooth continuation of the conversation. Such an embodiment can include integrating machine learning algorithms capable of guiding the user based at least in part on the interaction behavior of past and/or other users. Such a system can also, for example, enhance user satisfaction and trust by providing a more efficient conversation experience and enabling more personalized and context-aware interactions. Accordingly, at least one embodiment includes predicting and/or identifying one or more behavioral patterns in one or more conversational artificial intelligence chatbot settings.

Further, as noted above and described herein, one or more embodiments include implementing a dynamic pluggable task handler component-based portal framework for chatbot systems, enabling an agile, flexible architecture wherein various task handler component functionalities can be integrated into a chatbot system according to specific needs and/or task predictions. In such an embodiment, each task handler component can operate as an independent application, handling distinct features and/or enterprise domains. This modularity allows for the development, testing, and deployment of updates independently and more efficiently without disrupting the entire chatbot system. The pluggable nature of the portal facilitates adaption to changing enterprise and/or use case requirements by adding new functionalities and/or updating existing functionalities on the fly. For example, in a customer relationship management (CRM) system, one or more embodiments can include integrating additional features (e.g., purchase of warranty, an advanced product recommendation engine, etc.) as separate task handler components. This enhances the scalability and maintainability of the platform and enables a personalized user experience as components can be tailored to meet user preferences and/or behaviors, all while ensuring that the core chatbot system remains stable and secure.

While, in one or more embodiments, a pluggable task handler component-based portal is composed of a multitude of task handler components, individual task handler components are enabled and made available based on the need which is predicted by at least one machine learning model based on the past chatbot usage. For example, if skilled agents always attempt to drive a conversation or support experiences in a particular manner, at least one embodiment can include building a user experience which can learn and adapt from these interactions. This can be achieved, for instance, by composing each user experience-related functionality as a separate task handler component which is associated with a particular task. At any step of the user interaction process, by predicting the next step, the associated task handler component and corresponding functionality can be enabled. As further detailed herein, achieving such capabilities includes predicting the next task based on the current task and relevant historical usage data.

At least one embodiment includes leveraging at least one machine learning model and training the model(s) using data pertaining to past user interactions with designated generative artificial intelligence-based chatbots. Accordingly, such an embodiment includes capturing data pertaining to user interactions with designated generative artificial intelligence-based chatbots as one or more sets of tasks in a time series manner, and passing the sequence(s) of tasks to the machine learning model(s) to classify and predict the next task(s) in the sequence(s) based at least in part on the current task(s) of the user(s). Additionally, in such an embodiment, each task is associated with at least one particular task handler component which can be enabled and made available to the given chatbot by the portal framework.

One or more embodiments can include utilizing one or more similarity algorithms such as, for example, cosine similarity, Euclidian distance, and/or Manhattan distance. Additionally or alternatively, at least one embodiment can include considering the data processing task as a time series data prediction and/or classification problem. In such an embodiment, algorithms for performing the time series data prediction and/or classification can include at least one deep neural network-based long short-term memory (LSTM) model and/or a hidden Markov model (HMM). By way merely of example, at least one embodiment which utilizes at least one deep neural network-based LSTM model can include capturing temporal dynamics (e.g., changes and/or variations) of the tasks which can be leveraged to better understand usage patterns of a user with respect to a chatbot.

Figure 2:
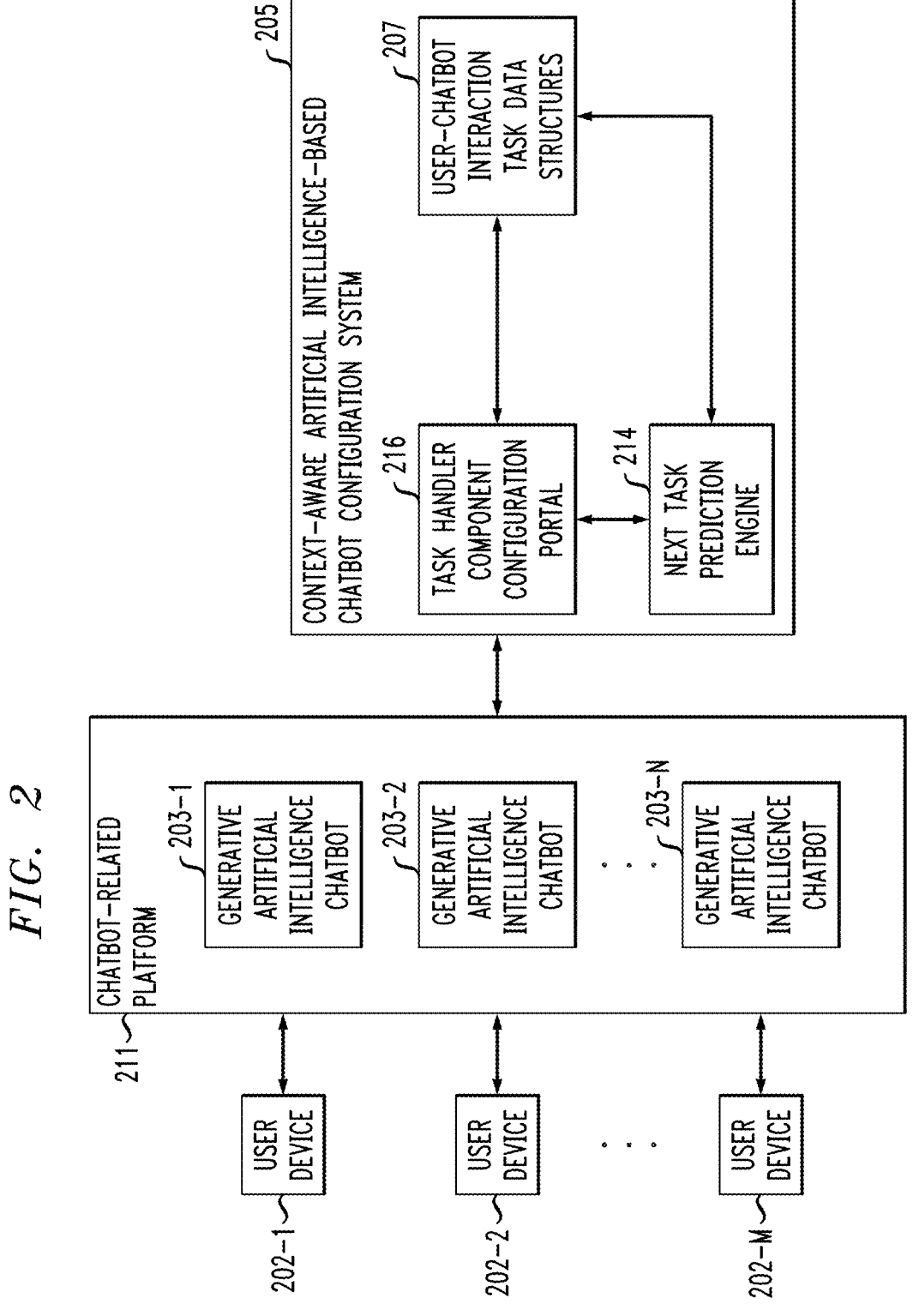
FIG. 2 shows example architecture for an artificial intelligence-based chatbot system with machine learning-based processing of data structures in an illustrative embodiment.

FIG. 2 shows example architecture for an artificial intelligence-based chatbot system with machine learning-based processing of data structures in an illustrative embodiment. By way of illustration, FIG. 2 depicts implementing a framework involving context-aware machine learning-based chatbot configuration system 205 wherein data pertaining to user interactions with generative artificial intelligence chatbots 203-1, 203-2, . . . 203-N, collectively referred to as generative artificial intelligence chatbots 203 and executing on chatbot-related platform 211, are captured while user devices 202-1, 202-2, . . . 202-M, collectively referred to herein as user devices 202, and/or generative artificial intelligence chatbots 203 progress through various tasks (e.g., questions and responses, content summarization, etc.). The sequence of tasks executed by user devices 202 and/or generative artificial intelligence chatbots 203 as part of an interaction can be converted to and/or processed as time series data and passed to next task prediction engine 214 to predict the next task of the interaction.

As detailed herein, next task prediction engine 214 predicts, using a machine learning model (e.g., an LSTM model and/or a recurrent neural network (RNN) model) the next task in a user-chatbot sequence based at least in part on the current task of the user and historical usage sequence data. Such a machine learning model can process temporal dependencies between actions in at least one given sequence. For example, a neural network model can take into account the order in which tasks occurred, which then can be leveraged for predicting one or more future tasks and/or actions based at least in part on previous tasks and/or actions of the user.

In at least one embodiment, an LSTM model can be utilized as part of next task prediction engine 214 and trained in an unsupervised manner to learn underlying patterns and/or relationships between tasks in user-chatbot interaction task data structures 207 (data which can include, e.g., keystroke delay metadata, and which can be provided by task handler component configuration portal 216). The trained LSTM model can then be used to predict the next task in an input sequence based at least in part on the current task of the input sequence, without being explicitly trained on a labeled dataset of tasks.

In connection with such an embodiment, to use an LSTM network in an unsupervised manner, an autoencoder architecture can be implemented. A goal of an autoencoder is to learn a representation and/or feature (also referred to as an encoding) for a set of data, e.g., for dimensionality reduction. Along with dimensionality reduction, a reconstruction can be learned wherein the autoencoder generates, from the reduced encoding, a representation as close as possible to the original input. Accordingly, an autoencoder can input data parameters (e.g., user identifier (ID), chatbot ID, task ID, etc.), and by performing encoding and decoding, can learn the correlation between at least a portion of the data parameters for learning one or more user behavior patterns with respect to user interactions with the given generative artificial intelligence-based chatbots.

Architecturally, autoencoders can represent a form of feed-forward neural networks referred to as artificial neural networks (ANNs) or multi-layer perceptrons (MLPs). Accordingly an autoencoder can include an input layer, an output layer and one or more hidden layers in between the input layer and the output layer. In one or more embodiments, the output layer will have the same number of nodes as the input layer. In such an embodiment, the LSTM model using the autoencoder can be trained to reconstruct an input sequence from a compressed representation of the input sequence and/or code of the input sequence. Further, in such an embodiment, an LSTM model can be used to encode the input sequence into a compressed representation, and another LSTM model can be used to decode the compressed representation back into the original sequence. During training, the autoencoder can be optimized, for example, to reduce and/or minimize the difference between the original input sequence and the reconstructed sequence. After training the encoder part of the model can be used as a predictor of the next action in the sequence based at least in part on the current action of the sequence.

Referring again to FIG. 2, the next action in the interaction sequence predicted by next task prediction engine 214 is provided to and/or processed by task handler component configuration portal 216, which identifies and procures at least one task handler component (using, for example, at least one API) related to and/or corresponding to the predicted next action. Accordingly, the at least one task handler component is dynamically incorporated into at least one of the generative artificial intelligence chatbots 203 for timely use as part of the ongoing user-chatbot interaction.

The implementation of a context-aware machine learning-based chatbot configuration system can be achieved, as implemented, for example, in the example pseudocode depicted in FIG. 3 through FIG. 8, by using Keras with a Tensorflow backend, a Python language, as well as Pandas, Numpy and ScikitLearn libraries.

FIG. 3 shows example pseudocode for preprocessing historical data in an illustrative embodiment. In this embodiment, example pseudocode 300 is executed by or under the control of at least one processing system and/or device. For example, the example pseudocode 300 may be viewed as comprising a portion of a software implementation of at least part of context-aware machine learning-based chatbot configuration system 105 of the FIG. 1 embodiment.

The example pseudocode 300 illustrates importing one or more datasets, functions, and/or libraries, reading a historical chatbot activities data file, and generating a Pandas data frame which contains the columns that are features for model training. Because one or more embodiments include implementing an unsupervised learning approach, such an embodiment will not include a target column. In conducting preprocessing of the data, at least one embodiment can include handling any null or missing values in the columns. In such an embodiment, null or missing values in numerical columns can be replaced by the median value of that column. Additionally, one or more embodiments can also include creating univariate and/or bivariate plots of the columns to determine and/or learn the importance and/or influence of each column.

It is to be appreciated that this particular example pseudocode shows just one example implementation of preprocessing historical data, and alternative implementations can be used in other embodiments.

FIG. 4 shows example pseudocode for encoding categorical values in an illustrative embodiment. In this embodiment, example pseudocode 400 is executed by or under the control of at least one processing system and/or device. For example, the example pseudocode 400 may be viewed as comprising a portion of a software implementation of at least part of context-aware machine learning-based chatbot configuration system 105 of the FIG. 1 embodiment.

The example pseudocode 400 illustrates encoding textual categorical values in connection with data preprocessing, as depicted in FIG. 3. As machine learning models are typically configured to process numerical values, textual categorical values in the columns are to be encoded. For example, categorical values such as user type, domain, etc., must be encoded, and example pseudocode 400 depicts performing such encoding by using a LabelEncoder function from a ScikitLearn library.

It is to be appreciated that this particular example pseudocode shows just one example implementation of encoding categorical values, and alternative implementations can be used in other embodiments.

FIG. 5 shows example pseudocode for configuring input data as an array in an illustrative embodiment. In this embodiment, example pseudocode 500 is executed by or under the control of at least one processing system and/or device. For example, the example pseudocode 500 may be viewed as comprising a portion of a software implementation of at least part of context-aware machine learning-based chatbot configuration system 105 of the FIG. 1 embodiment.

The example pseudocode 500 illustrates organizing input data as a Numpy array which can be obtained from the Pandas data frame (such as generated, e.g., via example pseudocode 300 in FIG. 3). Also, example pseudocode 500 illustrates setting the timestep (e.g., 1) in the sequence and the input dimension (e.g., 9) in the sample data set. Additionally, example pseudocode 500 depicts setting the latent dimension value using the number of dimensions that the autoencoder compresses, which, in example pseudocode, is 50% of the input dimension.

It is to be appreciated that this particular example pseudocode shows just one example implementation of configuring input data as an array, and alternative implementations can be used in other embodiments.

FIG. 6 shows example pseudocode for creating a neural network model in an illustrative embodiment. In this embodiment, example pseudocode 600 is executed by or under the control of at least one processing system and/or device. For example, the example pseudocode 600 may be viewed as comprising a portion of a software implementation of at least part of context-aware machine learning-based chatbot configuration system 105 of the FIG. 1 embodiment.

The example pseudocode 600 illustrates configuring an autoencoder with a long short-term memory-based (LSTM-based) encoder and decoder layer using a Keras library. More particularly, example pseudocode 600 depicts building the neural network model using a Keras functional model, as separate encoder and decoder models can be created and added to the functional model. Additionally, example pseudocode 600 also illustrates defining the neural network model, compiling the neural network model, and training the neural network model on historical data. As part of the model compiling, the neural network model can use an adaptive moment estimation (Adam) as the optimizer and "categorical_crossentropy" as the loss function.

It is to be appreciated that this particular example pseudocode shows just one example implementation of creating a neural network model, and alternative implementations can be used in other embodiments.

FIG. 7 shows example pseudocode for configuring an encoder model and a decoder model in an illustrative embodiment. In this embodiment, example pseudocode 700 is executed by or under the control of at least one processing system and/or device. For example, the example pseudocode 700 may be viewed as comprising a portion of a software implementation of at least part of context-aware machine learning-based chatbot configuration system 105 of the FIG. 1 embodiment.

The example pseudocode 700 illustrates implementing an encoder model, including encoder inputs and encoder states. Also, as depicted in FIG. 7, example pseudocode 700 illustrates implementing a decoder model, including decoder inputs, decoder state inputs, decoder states, and decoder outputs.

It is to be appreciated that this particular example pseudocode shows just one example implementation of configuring an encoder model and a decoder model, and alternative implementations can be used in other embodiments.

FIG. 8 shows example pseudocode for using a trained neural network model to predict a next action based on a current action in an illustrative embodiment. In this embodiment, example pseudocode 800 is executed by or under the control of at least one processing system and/or device. For example, the example pseudocode 800 may be viewed as comprising a portion of a software implementation of at least part of context-aware machine learning-based chatbot configuration system 105 of the FIG. 1 embodiment.

The example pseudocode 800 illustrates using the neural network model, once trained, to predict a future action by passing data pertaining to a current action to the predict ( ) function of the model. Such a prediction can include encoding at least a portion of the data pertaining to the current action using the encoder model.

It is to be appreciated that this particular example pseudocode shows just one example implementation of using a trained neural network model to predict a next action based on a current action, and alternative implementations can be used in other embodiments.

FIG. 9 is a flow diagram of a process for predicting next actions in user-chatbot interactions using machine learning techniques and configuring chatbot task handler components corresponding to the predicted next actions in an illustrative embodiment. It is to be understood that this particular process is only an example, and additional or alternative processes can be carried out in other embodiments.

In this embodiment, the process includes steps 900 through 904. These steps are assumed to be performed by context-aware machine learning-based chatbot configuration system 105 utilizing elements 112, 114, 116 and 118.

Step 900 includes processing data pertaining to one or more interactions between at least one user device and at least one artificial intelligence-based chatbot into one or more data structures. In at least one embodiment, wherein processing data pertaining to one or more interactions between at least one user device and at least one artificial intelligence-based chatbot into one or more data structures includes processing at least a portion of the data as time series data.

Step 902 includes predicting at least one future task of at least a portion of the one or more interactions by processing at least portions of the one or more data structures using one or more machine learning techniques. In one or more embodiments, predicting at least one future task of at least a portion of the one or more interactions includes processing at least portions of the one or more data structures using at least one deep neural network-based LSTM model. In such an embodiment, processing at least portions of the one or more data structures using at least one deep neural network-based LSTM model can include processing the at least portions of the one or more data structures using the at least one deep neural network-based LSTM model in an unsupervised manner by implementing at least one autoencoder architecture. Further, processing at least portions of the one or more data structures includes using the one or more machine learning techniques trained using historical user-chatbot interaction data and historical user behavior in connection with the at least one artificial intelligence-based chatbot.

Additionally or alternatively, predicting at least one future task of at least a portion of the one or more interactions can include processing at least portions of the one or more data structures using at least one of a cosine similarity algorithm, a Euclidian distance algorithm, and a Manhattan distance algorithm.

Step 904 includes identifying at least one task handler component related to at least one chatbot functionality associated with the at least one predicted future task. At least one embodiment also includes incorporating multiple chatbot functionalities into multiple respective task handler components. In such an embodiment, identifying at least one task handler component includes comparing the at least one predicted future task to the multiple chatbot functionalities of the multiple respective task handler components.

The techniques depicted in FIG. 9 can also include performing one or more automated actions related to providing dynamic access to the at least one task handler component via the at least one artificial intelligence-based chatbot. In one or more embodiments, performing one or more automated actions includes dynamically plugging the at least one task handler component into a user interface associated with the at least one artificial intelligence-based chatbot.

In at least one embodiment, the techniques depicted in FIG. 9 can also include training at least a portion of the one or more machine learning techniques using feedback related to the one or more automated actions related to providing dynamic access to the at least one task handler component via the at least one artificial intelligence-based chatbot.

Accordingly, the particular processing operations and other functionality described in conjunction with the flow diagram of FIG. 9 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to predict next actions in user-chatbot interactions using machine learning techniques and configure chatbot task handler components corresponding to the predicted next actions. These and other embodiments can effectively overcome problems associated with repetitive queries, errors, wasted resources, and/or decreased user trust.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 10 and 11. Although described in the context of system 100, these platforms may also be used to implement at least portions of other information processing systems in other embodiments.

Figure 10:
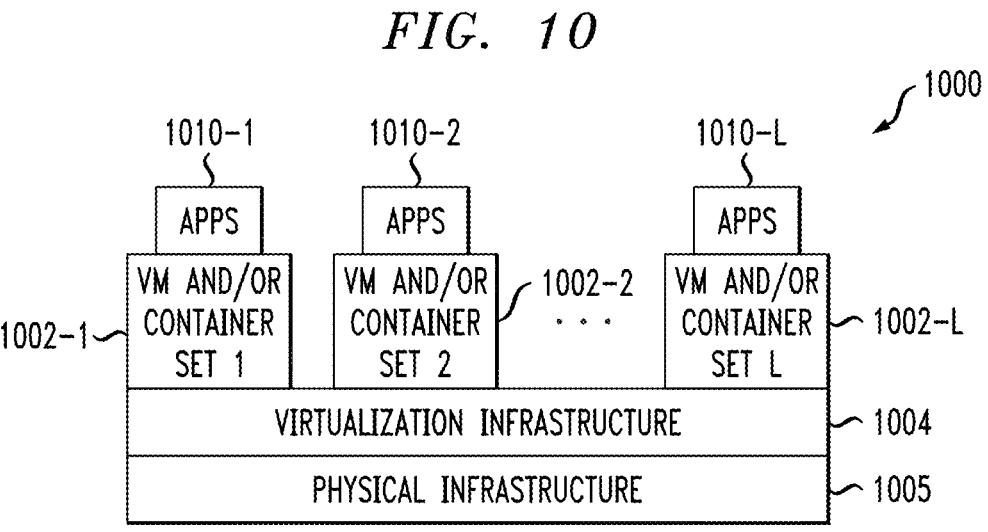
FIGS. 10 and 11 show examples of processing platforms that may be utilized to implement at least a portion of an information processing system in illustrative embodiments.
Figure 11:
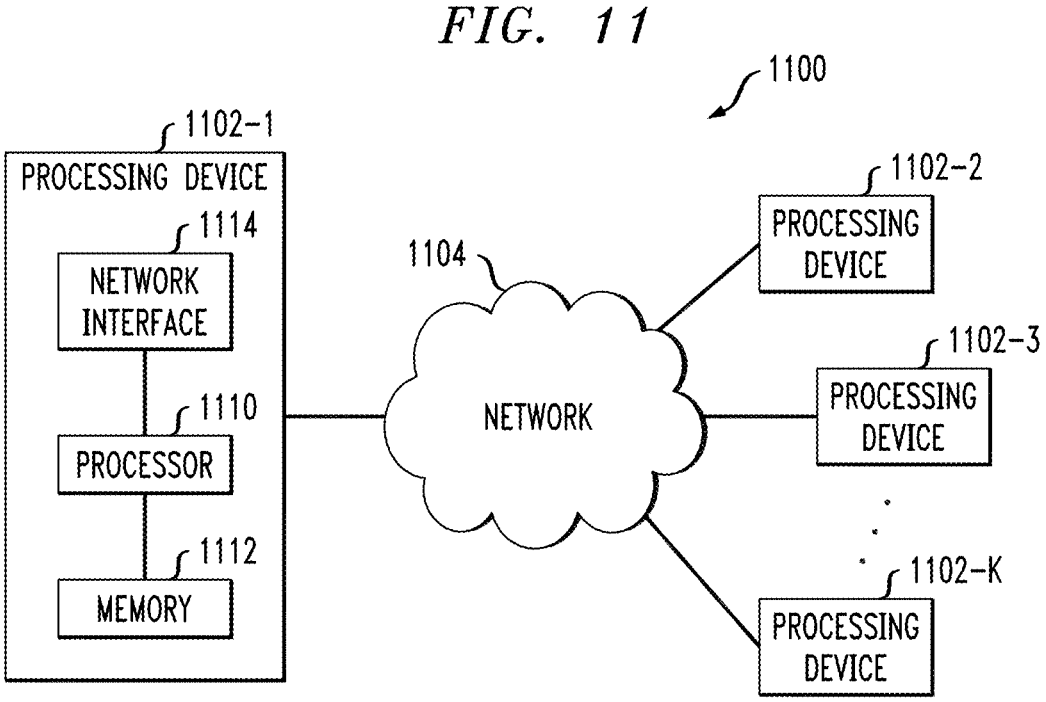

FIG. 10 shows an example processing platform comprising cloud infrastructure 1000. The cloud infrastructure 1000 comprises a combination of physical and virtual processing resources that are utilized to implement at least a portion of the information processing system 100. The cloud infrastructure 1000 comprises multiple virtual machines (VMs) and/or container sets 1002-1, 1002-2, . . . 1002-L implemented using virtualization infrastructure 1004. The virtualization infrastructure 1004 runs on physical infrastructure 1005, and illustratively comprises one or more hypervisors and/or operating system level virtualization infrastructure. The operating system level virtualization infrastructure illustratively comprises kernel control groups of a Linux operating system or other type of operating system.

The cloud infrastructure 1000 further comprises sets of applications 1010-1, 1010-2, . . . 1010-L running on respective ones of the VMs/container sets 1002-1, 1002-2, . . . 1002-L under the control of the virtualization infrastructure 1004. The VMs/container sets 1002 comprise respective VMs, respective sets of one or more containers, or respective sets of one or more containers running in VMs. In some implementations of the FIG. 10 embodiment, the VMs/container sets 1002 comprise respective VMs implemented using virtualization infrastructure 1004 that comprises at least one hypervisor.

A hypervisor platform may be used to implement a hypervisor within the virtualization infrastructure 1004, wherein the hypervisor platform has an associated virtual infrastructure management system. The underlying physical machines comprise one or more information processing platforms that include one or more storage systems.

In other implementations of the FIG. 10 embodiment, the VMs/container sets 1002 comprise respective containers implemented using virtualization infrastructure 1004 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 1000 shown in FIG. 10 may represent at least a portion of one processing platform. Another example of such a processing platform is processing platform 1100 shown in FIG. 11.

The processing platform 1100 in this embodiment comprises a portion of system 100 and includes a plurality of processing devices, denoted 1102-1, 1102-2, 1102-3, . . . 1102-K, which communicate with one another over a network 1104.

The network 1104 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 1102-1 in the processing platform 1100 comprises a processor 1110 coupled to a memory 1112.

The processor 1110 comprises a microprocessor, a CPU, a GPU, a TPU, a microcontroller, an ASIC, a FPGA or other type of processing circuitry, as well as portions or combinations of such circuitry elements.

The memory 1112 comprises RAM, ROM or other types of memory, in any combination. The memory 1112 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1102-1 is network interface circuitry 1114, which is used to interface the processing device with the network 1104 and other system components, and may comprise conventional transceivers.

The other processing devices 1102 of the processing platform 1100 are assumed to be configured in a manner similar to that shown for processing device 1102-1 in the figure.

Again, the particular processing platform 1100 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of an information processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
    processing data pertaining to one or more interactions between at least one user device and at least one artificial intelligence-based chatbot into one or more data structures;
    predicting at least one future task of at least a portion of the one or more interactions by processing at least portions of the one or more data structures using one or more machine learning techniques;
    identifying at least one task handler component related to at least one chatbot functionality associated with the at least one predicted future task; and
    performing one or more automated actions related to providing dynamic and independent access to each of the at least one task handler component via the at least one artificial intelligence-based chatbot, wherein providing dynamic and independent access comprises independently plugging each of the at least one task handler component into at least one user interface associated with the at least one artificial intelligence-based chatbot;
    wherein the method is performed by at least one processing device comprising a processor coupled to a memory.

2. The computer-implemented method of claim 1, wherein predicting at least one future task of at least a portion of the one or more interactions comprises processing at least portions of the one or more data structures using at least one deep neural network-based long short-term memory (LSTM) model.

3. The computer-implemented method of claim 2, wherein processing at least portions of the one or more data structures using at least one deep neural network-based LSTM model comprises processing the at least portions of the one or more data structures using the at least one deep neural network-based LSTM model in an unsupervised manner by implementing at least one autoencoder architecture.

4. The computer-implemented method of claim 1, wherein processing at least portions of the one or more data structures comprising using the one or more machine learning techniques trained using historical user-chatbot interaction data and historical user behavior in connection with the at least one artificial intelligence-based chatbot.

5. The computer-implemented method of claim 1, further comprising:

incorporating multiple chatbot functionalities into multiple respective task handler components.

6. The computer-implemented method of claim 5, wherein identifying at least one task handler component comprises comparing the at least one predicted future task to the multiple chatbot functionalities of the multiple respective task handler components.

7. The computer-implemented method of claim 1, wherein processing data pertaining to one or more interactions between at least one user device and at least one artificial intelligence-based chatbot into one or more data structures comprises processing at least a portion of the data as time series data.

8. The computer-implemented method of claim 1, wherein predicting at least one future task of at least a portion of the one or more interactions comprises processing at least portions of the one or more data structures using at least one of a cosine similarity algorithm, a Euclidian distance algorithm, and a Manhattan distance algorithm.

9. A non-transitory processor-readable storage medium having stored therein program code of one or more software programs, wherein the program code when executed by at least one processing device causes the at least one processing device:

to process data pertaining to one or more interactions between at least one user device and at least one artificial intelligence-based chatbot into one or more data structures;

to predict at least one future task of at least a portion of the one or more interactions by processing at least portions of the one or more data structures using one or more machine learning techniques;

to identify at least one task handler component related to at least one chatbot functionality associated with the at least one predicted future task; and to perform one or more automated actions related to providing dynamic and independent access to each of the at least one task handler component via the at least one artificial intelligence-based chatbot, wherein providing dynamic and independent access comprises independently plugging each of the at least one task handler component into at least one user interface associated with the at least one artificial intelligence-based chatbot.

10. The non-transitory processor-readable storage medium of claim 9, wherein predicting at least one future task of at least a portion of the one or more interactions comprises processing at least portions of the one or more data structures using at least one deep neural network-based long short-term memory (LSTM) model.

11. The non-transitory processor-readable storage medium of claim 10, wherein processing at least portions of the one or more data structures using at least one deep neural network-based LSTM model comprises processing the at least portions of the one or more data structures using the at least one deep neural network-based LSTM model in an unsupervised manner by implementing at least one autoencoder architecture.

12. An apparatus comprising:

at least one processing device comprising a processor coupled to a memory;

the at least one processing device being configured:

to process data pertaining to one or more interactions between at least one user device and at least one artificial intelligence-based chatbot into one or more data structures;

to predict at least one future task of at least a portion of the one or more interactions by processing at least portions of the one or more data structures using one or more machine learning techniques; and to identify at least one task handler component related to at least one chatbot functionality associated with the at least one predicted future task; and to perform one or more automated actions related to providing dynamic and independent access to each of the at least one task handler component via the at least one artificial intelligence-based chatbot, wherein providing dynamic and independent access comprises independently plugging each of the at least one task handler component into at least one user interface associated with the at least one artificial intelligence-based chatbot.

13. The apparatus of claim 12, wherein predicting at least one future task of at least a portion of the one or more interactions comprises processing at least portions of the one or more data structures using at least one deep neural network-based long short-term memory (LSTM) model.

14. The apparatus of claim 13, wherein processing at least portions of the one or more data structures using at least one deep neural network-based LSTM model comprises processing the at least portions of the one or more data structures using the at least one deep neural network-based LSTM model in an unsupervised manner by implementing at least one autoencoder architecture.

15. The apparatus of claim 12, wherein processing at least portions of the one or more data structures comprising using the one or more machine learning techniques trained using historical user-chatbot interaction data and historical user behavior in connection with the at least one artificial intelligence-based chatbot.

16. The apparatus of claim 12, wherein processing data pertaining to one or more interactions between at least one user device and at least one artificial intelligence-based chatbot into one or more data structures comprises processing at least a portion of the data as time series data.

17. The apparatus of claim 12, wherein predicting at least one future task of at least a portion of the one or more interactions comprises processing at least portions of the one or more data structures using at least one of a cosine similarity algorithm, a Euclidian distance algorithm, and a Manhattan distance algorithm.

18. The non-transitory processor-readable storage medium of claim 9, wherein processing at least portions of the one or more data structures comprising using the one or more machine learning techniques trained using historical user-chatbot interaction data and historical user behavior in connection with the at least one artificial intelligence-based chatbot.

19. The non-transitory processor-readable storage medium of claim 9, wherein processing data pertaining to one or more interactions between at least one user device and at least one artificial intelligence-based chatbot into one or more data structures comprises processing at least a portion of the data as time series data.

20. The non-transitory processor-readable storage medium of claim 9, wherein predicting at least one future task of at least a portion of the one or more interactions comprises processing at least portions of the one or more data structures using at least one of a cosine similarity algorithm, a Euclidian distance algorithm, and a Manhattan distance algorithm.

* * * * *